(12) United States Patent
Mariotti et al.

(10) Patent No.: US 8,944,746 B2
(45) Date of Patent: Feb. 3, 2015

(54) TURBOEXPANDER AND METHOD FOR USING MOVEABLE INLET GUIDE VANES AT COMPRESSOR INLET

(75) Inventors: Gabriele Mariotti, Florence (IT); Alberto Scotti Del Greco, Florence (IT); Stefano Ghiraldo, Forence (IT)

(73) Assignee: Nuovo Pignone S.p.A., Florence (IT)

( * ) Notice: Subject to any disclaimer, the term of this patent is extended or adjusted under 35 U.S.C. 154(b) by 817 days.

(21) Appl. No.: 13/167,043

(22) Filed: Jun. 23, 2011

(65) Prior Publication Data

US 2011/0318160 A1  Dec. 29, 2011

(30) Foreign Application Priority Data

Jun. 24, 2010 (IT) .............................. CO2010A0034

(51) Int. Cl.
*F01D 17/06* (2006.01)
*F01D 17/16* (2006.01)
(Continued)

(52) U.S. Cl.
CPC . *F01D 17/16* (2013.01); *F02C 9/20* (2013.01); *F25J 3/0295* (2013.01); *F25J 3/04781* (2013.01); *F25J 3/0209* (2013.01); *F25J 3/0233* (2013.01); *F25J 3/0238* (2013.01); *F25J 2230/20* (2013.01); *F25J 2230/32* (2013.01); *F25J 2230/60* (2013.01); *F25J 2240/02* (2013.01); *F25J 2280/02* (2013.01)
USPC ................. 415/1; 415/17; 415/169.2

(58) Field of Classification Search
CPC ..................................................... F01D 17/06
USPC ............. 416/1, 17, 24, 47, 169.2, 169.3, 191, 416/199.1, 208.1
See application file for complete search history.

(56) References Cited

U.S. PATENT DOCUMENTS 4,359,871 A * 11/1982 Strass .......................... 48/127.3
4,544,167 A 10/1985 Giroux
(Continued)

FOREIGN PATENT DOCUMENTS

| DE | 19728153 A1 | 1/1999 |
| EP | 1055809 A2 | 11/2000 |
| WO | 2008049818 A2 | 5/2008 |

OTHER PUBLICATIONS

Euler Turbine Equations, MIT, 2013, http://web.mit.edu/16.unified/www/FALL/thermodynamics/notes/node91.html.*

(Continued)

*Primary Examiner* — Nathaniel Wiehe
*Assistant Examiner* — Woody A Lee, Jr.
(74) *Attorney, Agent, or Firm* — GE Global Patent Operation

(57) ABSTRACT

A turboexpander-compressor system includes an expander configured to expand an incoming gas, a first set of moveable inlet guide vanes configured to control a pressure of the incoming gas, a compressor configured to compress a gas received from the expander, a shaft configured to support and rotate an expander impeller and a compressor impeller, a second set of moveable inlet guide vanes attached to the compressor and configured to control a pressure of the gas input into the compressor, and a controller configured to acquire information about a rotating speed of the shaft, a pressure and a temperature of the incoming gas, a pressure and a temperature of the gas output from the expander, and to control the second set of moveable inlet guide vanes to maximize a ratio between the rotating speed of the shaft and a drop of an enthalpy across the expander, in off-design conditions.

20 Claims, 6 Drawing Sheets

(51) Int. Cl.
*F02C 9/20* (2006.01)
*F25J 3/02* (2006.01)
*F25J 3/04* (2006.01)

(56) References Cited

U.S. PATENT DOCUMENTS

| | | | |
|---|---|---|---|
| 4,563,203 A | 1/1986 | Weiss et al. | |
| 5,136,854 A | 8/1992 | Abdelmalek | |
| 5,997,250 A * | 12/1999 | Carter et al. | 416/27 |
| 6,085,546 A | 7/2000 | Johnston | |
| 6,672,826 B2 | 1/2004 | Leduc | |
| 6,962,061 B2 * | 11/2005 | Wilding et al. | 62/613 |
| 7,219,512 B1 * | 5/2007 | Wilding et al. | 62/617 |
| 2007/0204615 A1 | 9/2007 | Vrbas et al. | |
| 2009/0232663 A1 * | 9/2009 | Mirsky et al. | 417/42 |

OTHER PUBLICATIONS

Italian Search Report, dated Feb. 18, 2011, for Italian application No. CO2010A000034, filed on Jun. 24, 2010.

* cited by examiner

TURBOEXPANDER AND METHOD FOR USING MOVEABLE INLET GUIDE VANES AT COMPRESSOR INLET

BACKGROUND OF THE INVENTION

1. Field of the Invention

Embodiments of the subject matter disclosed herein generally relate to methods and systems for achieving an enhanced operation of an expander using moveable inlet guide vanes at a compressor inlet.

2. Description of the Prior Art

Turboexpanders are widely used for industrial refrigeration, oil and gas processing and in low temperature processes. Turboexpanders are used, for example, to extract heavier hydrocarbon gases such as ethane ($C_2H_6$), propane ($C_3H_8$), normal butane (n-$C_4H_{10}$), isobutane (i-$C_4H_{10}$), pentanes and even higher molecular weight hydrocarbons, collectively referred to as natural gas liquids (NGL), from natural gas. A gas-liquid mixture resulting from an expansion of a raw gas in an expander is usually separated into a gas stream and a liquid stream. Most of the natural gas liquids are removed by outputting the liquid stream separately from the remaining gas stream, which is usually then compressed to be sent to downstream users.

FIG. 1 illustrates a conventional turboexpander-compressor system 100 in which a turboexpander 10 and a compressor 20 have impellers arranged on a same shaft 30. The turboexpander 10 is typically a centrifugal or axial flow expander inside which an incoming gas 40 is expanded. The gas expansion produces mechanical work causing a rotation of an expander impeller 50. The expanded gas is output as a gas flow 60. The gas flow 60 output from the turboexpander 10 may be input to the compressor 20 (i.e., the gas flow 70).

After an expansion (an isentropic expansion may be used for calculation purposes) of the incoming gas 40 having a pressure $p_1$ and a temperature $T_1$ when entering the turboexpander 10, the gas flow 60 has a pressure $p_2$ and a temperature $T_2$ which are respectively lower than the pressure $p_1$ and the temperature $T_1$.

Since a compressor impeller 80 is mounted on the same shaft 30 as the expander impeller 50, the rotation of the expander impeller 50 causes the rotation of the compressor impeller 80. In this manner, the mechanical work produced in the turboexpander 10 is transferred to the compressor 20. The expander impeller 50, the compressor impeller 80 and the shaft 30 rotate at the same speed. The energy of the rotation of the compressor impeller 80 is used in the compressor 20 to compress the gas flow 70 input at a pressure $p_3$ in the compressor 20. The compressor 20 outputs an output gas flow 90 having a pressure $p_4$ higher than the pressure $p_3$.

The pressure of the incoming gas 40 entering the turboexpander 10 is often controlled to be maintained around a design value. For example, a set of standard moveable input guide vanes (not shown in FIG. 1) may be used to control the pressure of the incoming gas 40 entering the turboexpander 10.

Ideally, at design conditions, the pressure $p_1$ of the incoming gas 40, and the pressure $p_2$ of the gas flow 60 output from the turboexpander 10 have predetermined values (i.e., within a range around the predetermined values). When the pressures $p_1$ and $p_2$ have the predetermined values, a speed u of the shaft is close to a design value. However, the turboexpander-compressor system at times functions in conditions different from the design conditions.

Generally, the turboexpander efficiency is related to a ratio of (i) the shaft speed u and (ii) the isentropic enthalpy drop across the turboexpander 10. However, that a real transformation occurs in the turboexpander 10. The real transformation is determined when knowing a gas composition, the pressure $p_1$ and the temperature $T_1$ of the incoming gas 40, and the pressure $p_2$ and the temperature $T_2$ of the gas flow 60 output from the turboexpander 10. The isoentropic enthalpy drop across the turboexpander 10 can be calculated knowing the gas composition, the pressure $p_1$, the temperature $T_1$, and the pressure $p_2$.

The compression in the compressor 20 passively affects the turboexpander efficiency by altering the speed u of the shaft 30. Therefore, in off-design conditions, the turboexpander efficiency is not optimized when a single parameter, the pressure $p_1$ of the incoming gas 40, is adjusted. Being able to adjust only the pressure $p_1$ of the incoming gas 40 limits an operator ability to optimize the turboexpander efficiency.

If no additional source of energy is used, the compression is a by-product of the expansion in the expander 10. The compression efficiency is determined by the pressure $p_3$ of the gas input in the compressor 20, and a rotation speed of the compressor impeller, which is the same as the rotation speed u of the shaft 30.

In the conventional turboexpander-compressor system capable to adjust only the pressure $p_1$ of the incoming gas 40, an operator has no leverage to fully control the rotating speed u of the shaft 30 for off-design conditions.

Accordingly, it would be desirable to provide systems and methods that avoid the afore-described problems and drawbacks.

SUMMARY OF THE INVENTION

According to one exemplary embodiment, a turboexpander-compressor system includes an expander, a first set of moveable inlet guide vanes, a compressor, a shaft, a second set of moveable inlet guide vanes and a controller. The expander is configured to expand an incoming gas, and has an expander impeller. The first set of moveable inlet guide vanes are attached to the expander and are configured to control a pressure of the incoming gas. The compressor is configured to compress a gas received from the expander, and has a compressor impeller. The shaft is configured to support and rotate the expander impeller and the compressor impeller. The second set of moveable inlet guide vanes are attached to the compressor and are configured to control a pressure of the gas input into the compressor. The controller, which is connected to the second set of moveable inlet guide vanes, is configured to acquire information about a rotating speed of the shaft, the pressure and a temperature of the incoming gas, and a pressure and a temperature of the gas output by the expander. The controller is also configured to control the second set of moveable inlet guide vanes in order to adjust the pressure of the gas input into the compressor to maximize a ratio between the rotating speed of the shaft and a drop of an enthalpy across the expander in off-design conditions.

According to another exemplary embodiment, a method of controlling a turboexpander-compressor system having an expander with an expander impeller connected via a shaft to a compressor impeller of a compressor that compresses a gas flow output by the expander is provided. The method includes receiving first information on a pressure and a temperature of an incoming gas entering the expander, receiving second information on a pressure of a gas output by the expander, and receiving third information on a rotating speed of the shaft attached to the compressor impeller and the expander impeller. The method further includes determining when the turboexpander-compressor system functions in off-design conditions based on the received first, second and third information. The method further includes comparing a ratio between the rotating speed of the shaft and a drop of an enthalpy across the expander with a predetermined value, when determined that the turboexpander-compressor system functions in the off-design conditions. The method also includes controlling a compressor set of moveable inlet guide vanes connected to a compressor inlet to adjust a pressure of the gas input in the compressor, to bring the ratio between the rotating speed of the shaft and the drop of the enthalpy across the expander in the off-design conditions closer to the predetermined value.

According to another embodiment, a controller configured to control an turboexpander-compressor system has an interface and a control unit. The turboexpander-compressor system has an expander with an expander impeller, and a compressor with a compressor impeller, the expander impeller and the compressor impeller being rotated by a same shaft, and the compressor compressing a gas output by the expander. The interface is configured to receive information on a pressure and a temperature of an incoming gas entering the expander, a pressure and a temperature of the gas output by the expander, and a rotating speed of the shaft, and to output commands to a compressor set of inlet vanes configured to control a pressure of the gas input in the compressor. The control unit is connected to the interface and is configured to receive the information from the interface, determine when the turboexpander-compressor system functions in off-design conditions, and generate the commands for the compressor set of moveable inlet guide vanes in order to maintain a ratio between the rotating speed of the shaft and a drop of enthalpy across the expander within a predetermined range, in off-design conditions.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of turboexpander-compressor systems. However, the embodiments to be discussed next are not limited to these systems, but may be applied to other systems that transfer work generated by an expander to a compressor compressing gas output by the expander.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
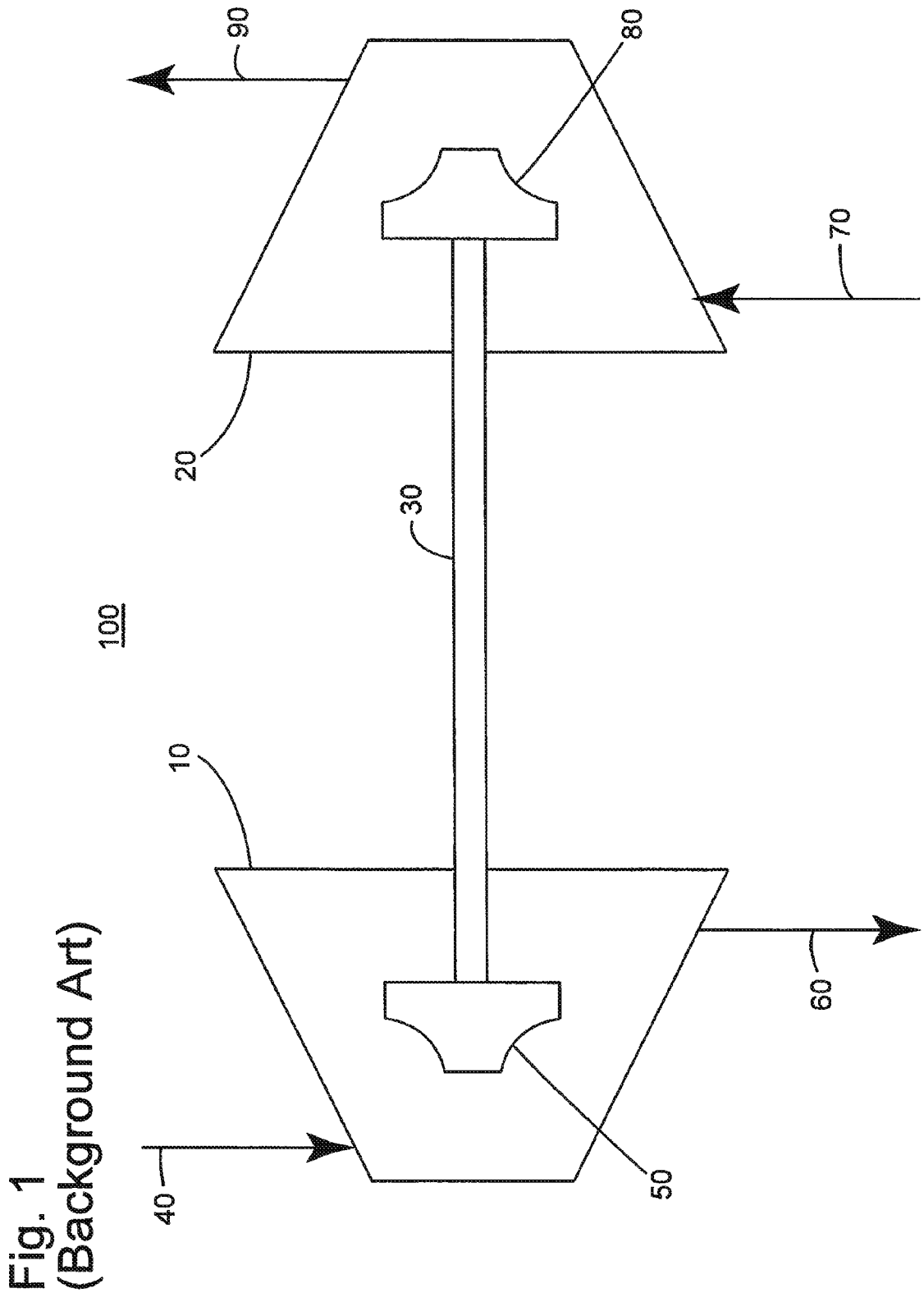
FIG. 1 is a schematic diagram of a conventional turboexpander-compressor system.
Figure 2:
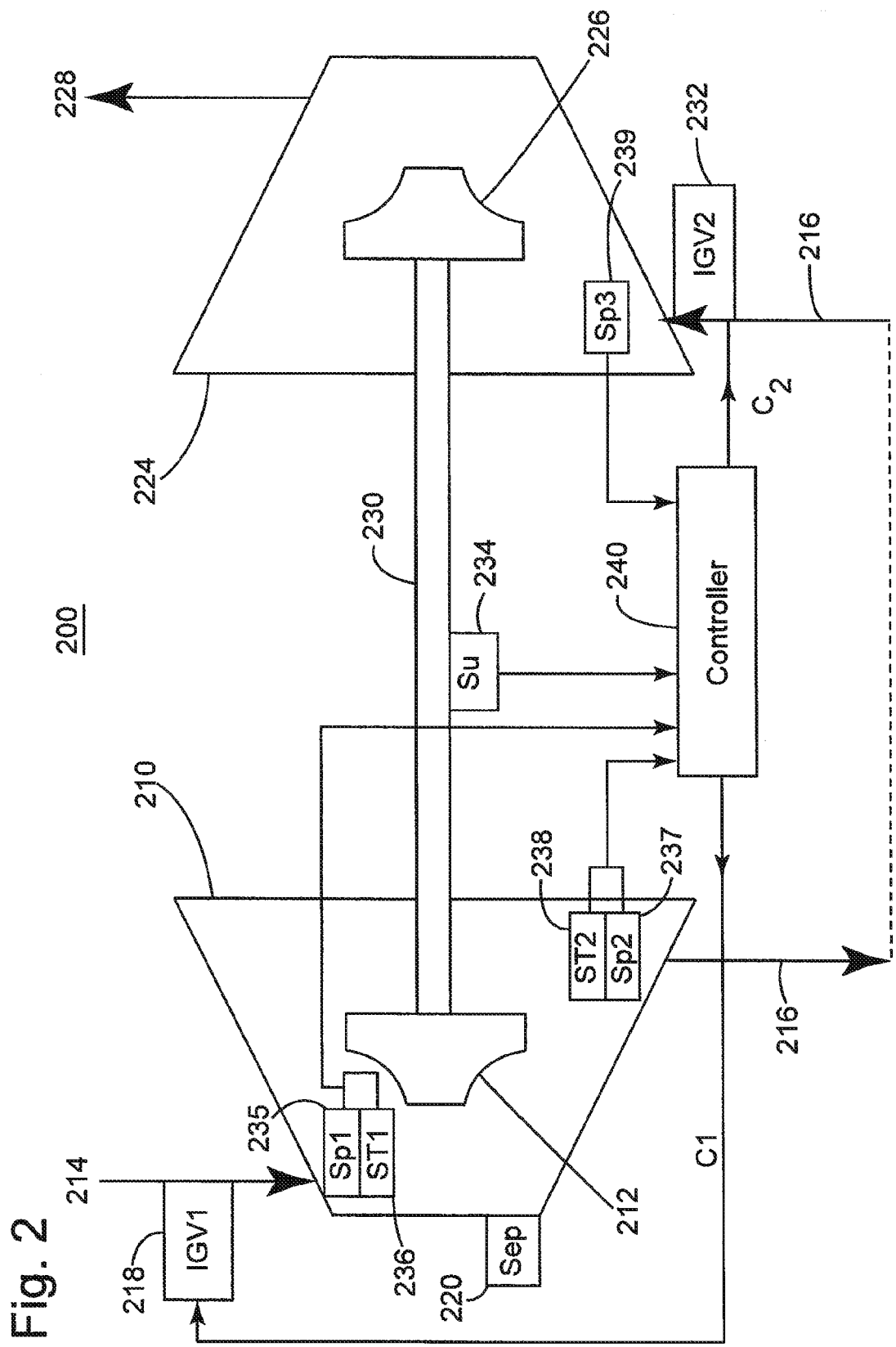
FIG. 2 is a schematic diagram of a turboexpander-compressor system according to an exemplary embodiment.

FIG. 2 is a schematic diagram of a turboexpander-compressor system 200 according to an exemplary embodiment. An expander 210 has an expander impeller 212. The expander 210 receives an incoming gas flow 214. Inside the expander 210, the gas may expand and thus, cause rotation of the expander impeller 212. The expanded gas is output from the expander 210 as a gas flow 216.

When the turboexpander-compressor system 200 functions at design conditions, a pressure $p_1$ and a temperature $T_1$ of the incoming gas flow 214, as well as a pressure $p_2$ and a temperature $T_2$ of the gas flow 216 have values close to predetermined values. However, at times, the turboexpander-compressor system functions in off-design conditions. When off-design conditions occur, the pressure $p_1$ of the incoming gas flow 214 may be adjusted to become again close to the respective predetermined value, using, for example, a first set of moveable input guide vanes (IGV1) 218. The IGV1 218 are attached to an inlet of the expander 210.

If the incoming gas flow 214 is a mixture of gases including heavier hydrocarbon gases, most of the heavier hydrocarbon gases liquefy at the low temperatures achieved due to the expansion. In one application, the liquefied heavier hydrocarbon gases may be removed from the expander 210 as a separate liquid stream by a separator (Sep) 220.

In the turboexpander-compressor system 200 illustrated in FIG. 2, a compressor 224 has a compressor impeller 226. The compressor 224 receives the gas flow 216 from the expander 210 and outputs a compressed gas flow 228. However, between the expander 210 and the compressor 224, the pressure of the gas flow 216 may be altered due to other process components (e.g., separators, coolers, valves) and pressure losses, the gas flow 216 having a pressure $p_3$ when input in the compressor 224.

The mechanical work generated due to the expansion of the gas rotates the expander impeller 212. The expander impeller 212 is mounted on the same shaft 230 as the compressor impeller 226. Due to this arrangement, the compressor impeller 226 also rotates due to the mechanical work generated during the expansion of the gas in the expander 210. The rotation of the compressor impeller 226 provides energy used to compress the gas in the compressor 224. Thus, if no additional source of energy is used, the compression is a by-product of the expansion in the expander 210.

Conversely, the mechanical work necessary to rotate the compressor impeller 226 also named load, affects the rotating speed u of the shaft 230, and, thereby, indirectly affects the process of expanding the gas inside the expander 210.

The expander efficiency is related to a ratio of the rotating speed u of the shaft 230, and a drop of an enthalpy $\Delta H$ across the expander 210. The gas expansion in the expander 210 may be approximated as being an isoentropic process. The isoentropic drop of the enthalpy $\Delta H$ across the expander may be estimated as a function of (i) the pressure $p_1$ and the temperature $T_1$ of the incoming gas flow 214 entering the expander 210, (ii) the pressure $p_2$ of the gas flow 216 output from the expander 210, and (iii) a gas composition. The gas composition may be a constant, input manually or provided as an output of a gas composition analyzer.

In reality, the gas expansion in the expander 210 is not an ideal isoentropic process. The drop of the enthalpy ΔH across the expander 210 may be calculated using (i) the pressure $p_1$ and the temperature $T_1$ of the incoming gas 214 entering the expander 210, (ii) the pressure $p_2$ and the temperature $T_2$ of the gas flow 216 output from the expander 210, and (iii) the gas composition.

The characteristic parameters (i.e., $p_1$, $T_1$, $p_2$ and $T_2$) of the gas expansion in the expander 210 and the rotating speed u of the shaft 230 may not vary independently. Therefore, in off-design conditions, in order to maximize the expander efficiency, the pressure $p_3$ of the gas flow 216 input in the compressor 224 may be controlled, for example, by a second set of moveable inlet guide vanes (IGV2) 232 provided at the compressor inlet. By modifying the pressure $p_3$ of the gas flow 216 input in the compressor 224, the rotating speed u of the shaft 230 is modified and, therefore, the expander efficiency in the expander 210 can be maximized.

The rotating speed u of the shaft 230 may be measured at a location between the expander 210 and the compressor 224, next to the shaft 230, for example, by a speed sensor (Su) 234. The pressure $p_1$ and the temperature $T_1$ of the incoming gas flow 214 entering the expander 210 may be measured, for example, by a sensor (Sp1) 235 and a sensor (ST1) 236, respectively.

The pressure $p_2$ and a temperature $T_2$ of the gas flow 216 may be measured at the output of the expander 210, for example, by a sensor (Sp2) 237 and a sensor (ST2) 238, respectively. The pressure $p_3$ of the gas flow 216 at the input of the compressor 224 may be measured, for example, by a sensor (Sp3) 239.

A controller 240 acquires information regarding the pressure $p_1$ and the temperature $T_1$ of the incoming gas flow 214 entering the expander 210, the pressure $p_2$ of the gas flow 216 entering the compressor 224, and the rotating speed u of the shaft 230, from the sensors 234, 235, 236, and 237, respectively.

In one embodiment, the controller 240 may send commands $C_1$ to IGV1 218 in order to adjust the pressure $p_1$ of the incoming gas flow 214 to be within a predetermined range.

Based on monitoring the acquired information, the controller 240 determines when the turboexpander-compressor system 200 functions in off-design conditions. When the controller 240 determines that the turboexpander-compressor system 200 functions in off-design conditions, the controller 240 sends commands $C_2$ to the second set of IGV2 232 to adjust the pressure $p_3$ of the gas input into the compressor in order to maximize a ratio R between the rotating speed u of the shaft 230 and the drop of the enthalpy ΔH across the expander 210.

Figure 3:
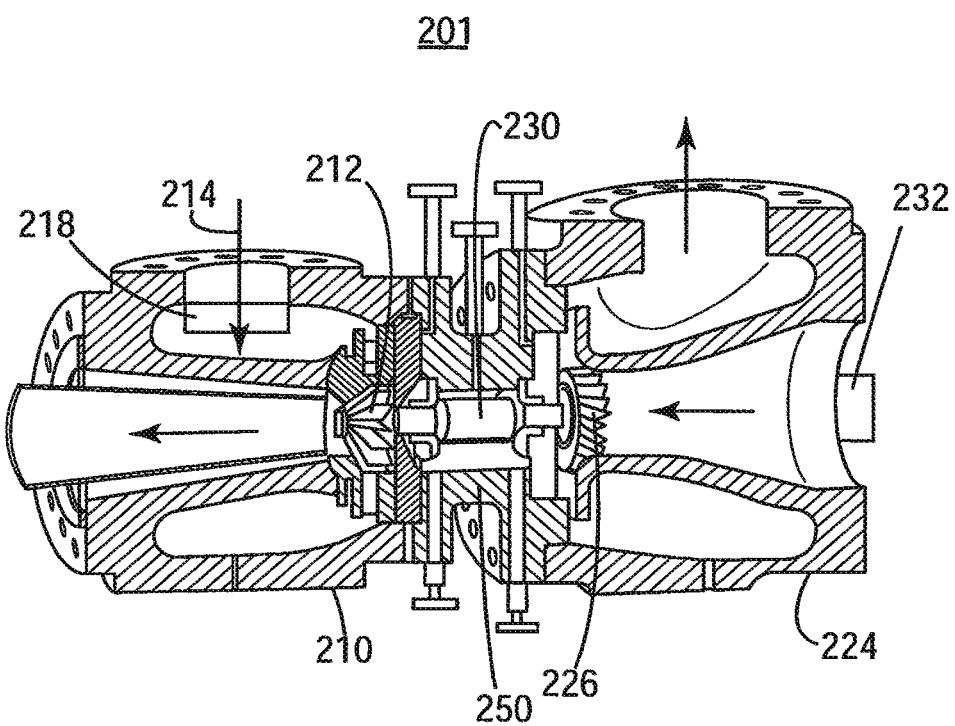
FIG. 3 is a turboexpander-compressor system according to another exemplary embodiment.

FIG. 3 illustrates an exemplary embodiment of a turboexpander-compressor system 201 having the expander 210 with the expander impeller 212, and the compressor 224 with the compressor impeller 226 mounted on the same shaft 230. The pressure $p_1$ of the incoming gas flow 214 entering the expander 210 is adjusted by the set of moveable inlet guide vanes 218. The pressure $p_3$ of the gas flow input in the compressor 224 is controlled by the set of moveable inlet guide vanes 232. The expander 210, the shaft 230 and the compressor 224 are encased in a casing 250. The casing 250 holds the expander 210, the shaft 230 and the compressor 224 at predetermined locations relative to each other.

Figure 4:
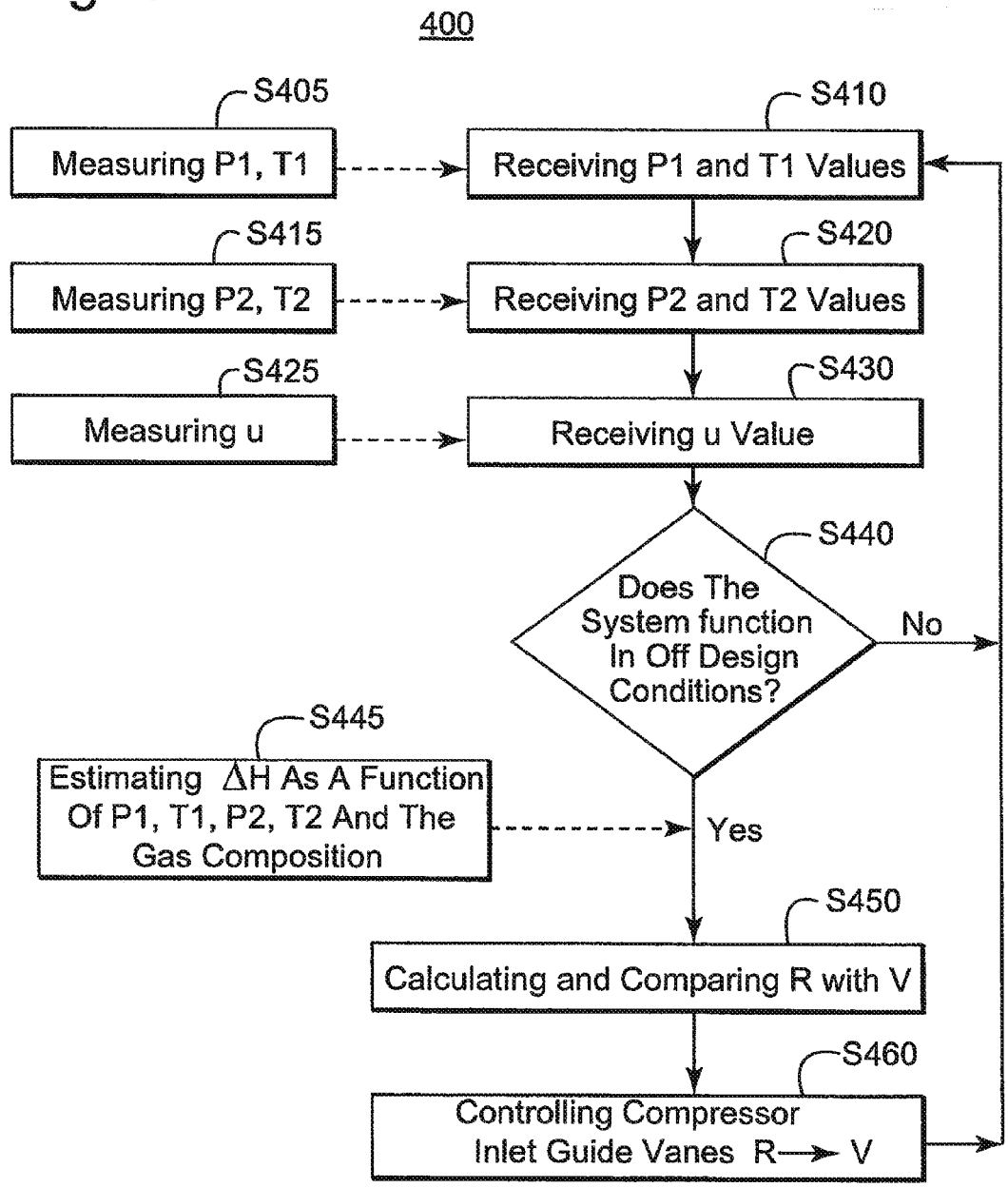
FIG. 4 is a flow diagram of a method of controlling a turboexpander-compressor system according to another exemplary embodiment.

According to an exemplary embodiment, FIG. 4 illustrates a method 400 performed by a turboexpander-compressor system having an expander with an expander impeller connected via a shaft to a compressor impeller of a compressor that compresses a gas flow output by the expander. The method, which may be performed by a controller similar to the controller 240 in FIG. 2, includes receiving first information on a pressure $p_1$ and a temperature $T_1$ of an incoming gas entering the expander at S410, receiving second information on a pressure $p_2$ and a temperature $T_2$ of a gas output by the expander at S420, and receiving third information on a rotating speed u of a shaft attached to the compressor impeller and the expander impeller, at S430.

The first information on the pressure $p_1$ and the temperature $T_1$ of an incoming gas entering the expander may be based on measuring the pressure $p_1$ and the temperature $T_1$ at S405, for example, by a sensor such as Sp1 235 and ST1 236 in FIG. 2. The second information on the pressure $p_2$ and the temperature $T_2$ of the gas output by the expander may be based on measuring the pressure $p_2$, at S415. The pressure $p_2$ and the temperature $T_2$ may be measured, for example, by sensors such as Sp2 237 and ST2 238 in FIG. 2, at an exit of the expander 210. The third information on the rotating speed u of the shaft may be based on measuring a rotating speed u at S425. The rotating speed u may be measured, for example, by a sensor such as Su 234 in FIG. 2 at a location next to the shaft 230, between the expander 210 and the compressor 224 therein.

The method illustrated in FIG. 4 further includes determining when the turboexpander-compressor system functions in off-design conditions at S440. If determined that the turboexpander-compressor system does not function in the off-design conditions, the method loops back receiving information on $p_1$ and $T_1$ (S410), $p_2$ (S420), and u (S430), and determining whether the turboexpander-compressor system functions in off-design conditions (S440).

If determined that the turboexpander-compressor system functions in off-design conditions, the method further includes calculating and comparing a ratio R between the rotating speed of the shaft u and a drop of an enthalpy ΔH across the expander with a predetermined value V at S450. The enthalpy drop may be calculated as a function of $p_1$, $T_1$, $p_2$, $T_2$, and the gas composition at S445.

The method further includes controlling a compressor set of moveable inlet guide vanes connected to a compressor inlet through which the gas output by the expander enters into the compressor, to adjust the pressure $p_3$ of the gas input into the compressor, such as to bring the ratio R closer to the predetermined value V at S460.

The method may further include adjusting an expander set of moveable inlet guide vanes such as IGV1 in FIG. 2 located at the input of the expander to maintain the pressure $p_1$ of the incoming gas entering the expander within a predetermined range.

When the incoming gas is a mixture including heavy components, the method may further include separating the heavy components that are liquefied in the expander from the gas output from the expander and input into the compressor, for example, by a separator such as Sep 220 in FIG. 2.

The method may calculate the drop of the enthalpy across the expander using a function of (i) the pressure $p_1$ and the temperature $T_1$ of the incoming gas, (ii) the pressure $p_2$ of the gas output from the expander and (iii) a gas composition, assuming that the gas expansion in the expander is an isoentropic process.

Figure 5:
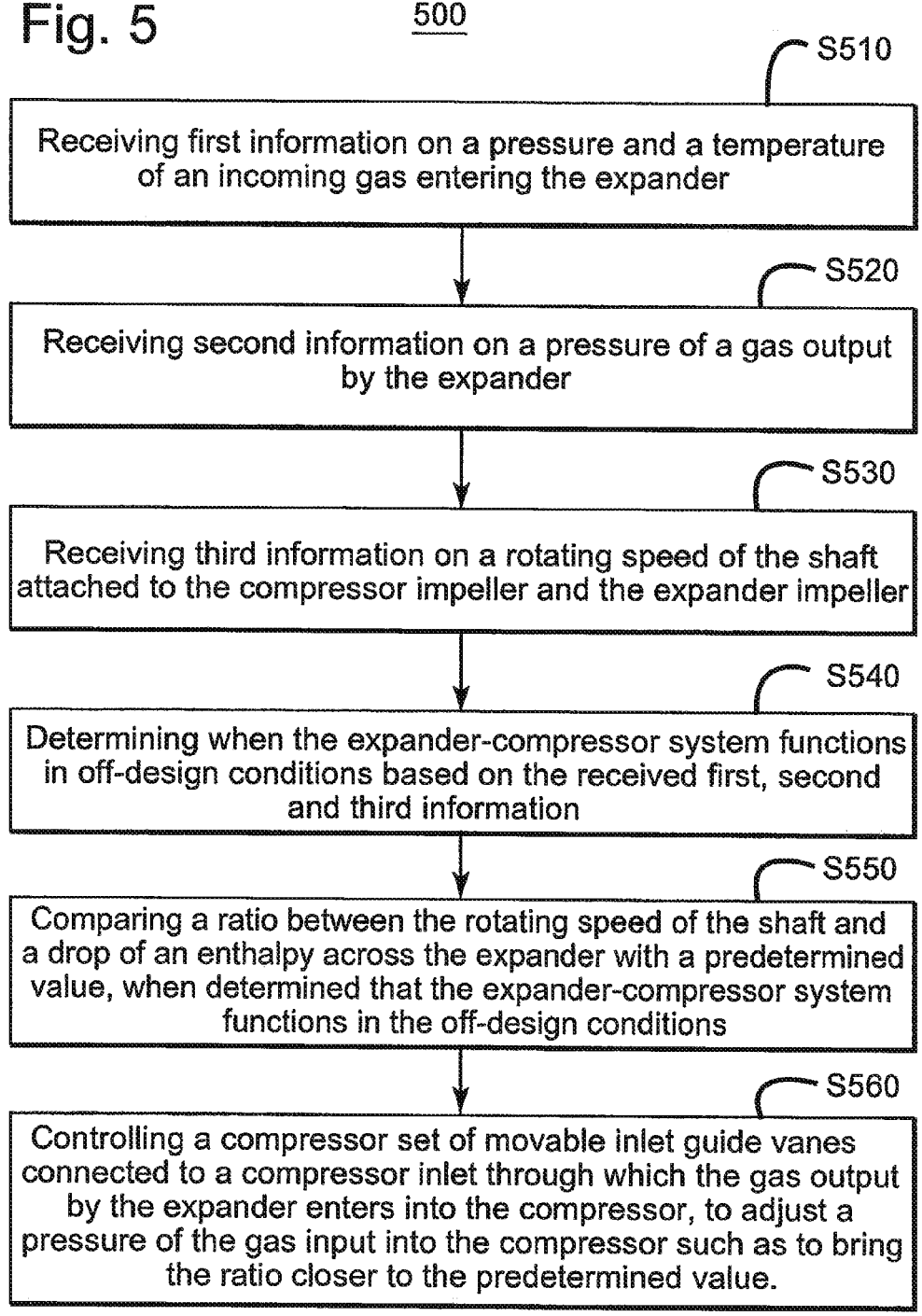
FIG. 5 is a flow diagram of a method of controlling a turboexpander-compressor system according to another exemplary embodiment.

According to another exemplary embodiment, FIG. 5 illustrates a method 500 of controlling a turboexpander-compressor system having an expander with an expander impeller connected via a shaft to a compressor impeller of a compressor that compresses a gas flow output by the expander.

The method includes receiving first information on a pressure and a temperature of an incoming gas entering the expander at S510, receiving second information on a pressure of a gas output by the expander at S520, and receiving third information on a rotating speed of the shaft attached to the compressor impeller and the expander impeller at S530.

The method further includes determining when the turboexpander-compressor system functions in off-design conditions based on the received first, second and third information at S540.

The method also includes comparing a ratio between the rotating speed of the shaft and a drop of an enthalpy across the expander with a predetermined value, when determined that the turboexpander-compressor system functions in the off-design conditions at S550.

The method further includes controlling a compressor set of moveable inlet guide vanes connected to a compressor inlet and through which the gas output by the expander enters into the compressor, to adjust the pressure of the gas input into the compressor such as to bring the ratio closer to the predetermined value at S560.

Figure 6:
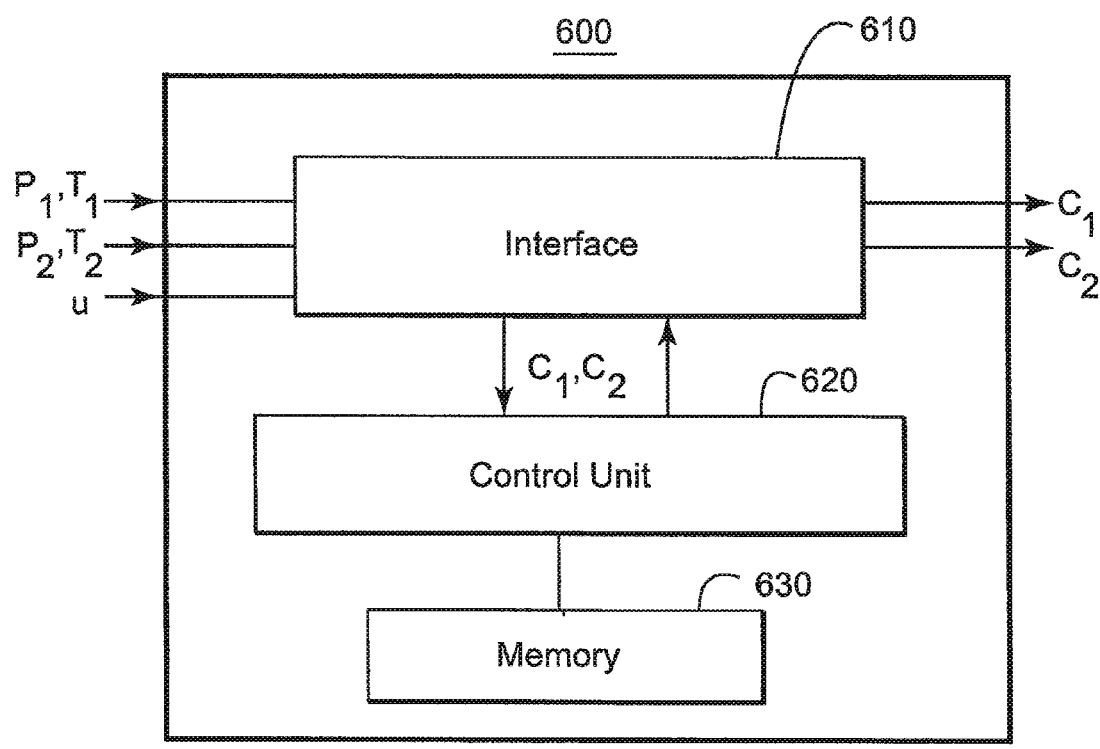
FIG. 6 is a controller according to another exemplary embodiment.

FIG. 6 illustrates a controller according to another exemplary embodiment. The controller 600 is configured to control a turboexpander-compressor system such as 200 in FIG. 2. The controller may include an interface 610, a control unit 620 and a memory 630.

The interface 610 receives information on the pressure $p_1$ and the temperature $T_1$ of the incoming gas entering the expander, the pressure $p_2$ of the gas output by the expander, and the rotating speed u of the shaft, for example, from sensors such as Sp1 235, ST1 236, Sp2 237, and Su 234 in FIG. 2. The interface 610 may also receive information about the temperature $T_2$ of the gas output from the expander and the pressure $p_3$ of the gas input in the compressor from sensors such as ST2 238 and Sp3 239 in FIG. 2. The interface 610 is also configured to output commands $C_2$ to the compressor set of inlet vanes such as IGV2 232 in FIG. 2. The interface 610 may also be configured to output commands $C_1$ to the expander set of moveable inlet guide vanes such as IGV1 in FIG. 2.

The control unit 620 is connected to the interface 610 and monitors the information received through the interface, to determine, for example, when the turboexpander-compressor system functions in off-design conditions. For example, the controller may determine whether the turboexpander-compressor system functions in off-design conditions by comparing values or functions of the pressure $p_1$, the temperature $T_1$, the pressure $p_2$, and a rotating speed u of the shaft with predetermined values stored in a memory 630. A composition of the gas used to calculate the drop of the enthalpy may also be stored in the memory 630.

If the control unit 620 determines that the turboexpander-compressor system functions in the off-design conditions, the control unit 620 generates commands to be transmitted to the compressor set of moveable inlet guide vanes, to adjust the pressure $p_3$ of the gas input in the compressor in order to maintain the ratio R between the rotating speed u of the shaft and the drop of enthalpy $\Delta H$ across the expander, within a predetermined range.

The control unit 620 may be configured to estimate the drop in enthalpy $\Delta H$ using the information on the pressure $p_1$, the temperature $T_1$, the pressure $p_2$ and the composition of the gas. The control unit 620 may also generate commands to be transmitted to the expander set of inlet guide vanes in order to maintain the pressure $p_1$ within a predetermined range. The interface 610 may then output these commands to the expander set of inlet guide vanes. The control unit 620 may be implemented in hardware, firmware, software or a combination thereof.

The disclosed exemplary embodiments provide a system, a method and a controller which maximize a turboexpander-compressor system efficiency in off-design conditions using a set of moveable inlet guide vanes at an inlet of the compressor. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A turboexpander-compressor system, the system comprising:
    an expander configured to expand an incoming gas and having an expander impeller;
    a first set of moveable inlet guide vanes attached to the expander and configured to control a pressure of the incoming gas;
    a compressor configured to compress a gas received from the expander and having a compressor impeller;
    a shaft configured to support and rotate the expander impeller and the compressor impeller;
    a compressor set of moveable inlet guide vanes connected to a compressor inlet and through which the gas output by the expander enters into the compressor;
    a controller connected to the moveable inlet guide vanes and configured to:
        acquire information about a rotating speed of the shaft, the pressure and a temperature of the incoming gas, and a pressure and a temperature of the gas output by the expander, and
        compare a ratio between the rotating speed of the shaft and a drop of an enthalpy across the expander with a predetermined value, when determined that the turboexpander-compressor system functions in the off-design conditions; and
        control a compressor set of moveable inlet guide vanes connected to a compressor inlet through which the gas output by the expander enters into the compressor, to adjust a pressure of the gas input into the compressor such as to bring the ratio closer to the predetermined value.

2. The turboexpander-compressor system of claim 1, wherein an expander efficiency is related to the ratio of the rotating speed of the shaft and the drop of the enthalpy across the expander.

3. The turboexpander-compressor system of claim 1, further comprising:
a first sensor configured to measure the rotating speed of the shaft;
a second sensor configured to measure the pressure of the incoming gas;
a third sensor configured to measure the temperature of the incoming gas;
a fourth sensor configured to measure the pressure of the gas output by the expander; and
a fifth sensor configured to measure the temperature of the gas output by the expander,
wherein the drop in the enthalpy is estimated using the information achieved from the first, second, third, fourth and fifth sensors.

4. The turboexpander-compressor system of claim 1, further comprising: a sensor located at an inlet of the compressor, connected to the controller and configured to measure a pressure of the gas input in the compressor.

5. The turboexpander-compressor system of claim 1, wherein the controller is configured to determine when the turboexpander-compressor system functions in off-design conditions.

6. The turboexpander-compressor system of claim 1, wherein the controller is configured to control the first set of moveable inlet guide vanes to maintain the pressure of the incoming gas in a predetermined range.

7. The turboexpander-compressor system of claim 1, wherein the controller is configured to estimate the drop of the enthalpy across the expander using a function of the pressure of the incoming gas, the temperature of the incoming gas, a composition of the incoming gas, and the pressure of the gas output by the expander.

8. The turboexpander-compressor system of claim 1, further comprising:
a casing configured to hold the expander, the shaft and the compressor at predetermined locations.

9. A method of controlling a turboexpander-compressor system having an expander with an expander impeller connected via a shaft to a compressor impeller of a compressor that compresses a gas flow output by the expander, the method comprising:
receiving first information on a pressure and a temperature of an incoming gas entering the expander;
receiving second information on a pressure of a gas output by the expander;
receiving third information on a rotating speed of the shaft attached to the compressor impeller and the expander impeller;
determining when the turboexpander-compressor system functions in off-design conditions based on the received first, second and third information;
comparing a ratio between the rotating speed of the shaft and a drop of an enthalpy across the expander with a predetermined value, when determined that the turboexpander-compressor system functions in the off-design conditions; and
controlling a compressor set of moveable inlet guide vanes connected to a compressor inlet through which the gas output by the expander enters into the compressor, to adjust a pressure of the gas input into the compressor such as to bring the ratio closer to the predetermined value.

10. The method of claim 9, wherein an expander efficiency is related to the ratio of the rotating speed of the shaft and the drop of the enthalpy across the expander.

11. The method of claim 9, wherein receiving the first information, second information, and third information comprises the use of a first sensor configured to measure the rotating speed of the shaft; a second sensor configured to measure the pressure of the incoming gas; a third sensor configured to measure the temperature of the incoming gas; a fourth sensor configured to measure the pressure of the gas output by the expander; and a fifth sensor configured to measure the temperature of the gas output by the expander, wherein the drop in the enthalpy is estimated using the information achieved from the first, second, third, fourth and fifth sensors.

12. The method of claim 9, wherein measuring a pressure of the gas input in the compressor comprises using a sensor located at an inlet of the compressor, and connected to the controller.

13. The method of claim 9, further comprising determining when the turboexpander-compressor system functions in off-design conditions.

14. The method of claim 9, wherein further comprising estimating the drop of the enthalpy across the expander using a function of the pressure of the incoming gas, the temperature of the incoming gas, a composition of the incoming gas, and the pressure of the gas output by the expander.

15. A controller configured to control a turboexpander-compressor system having an expander with an expander impeller, and a compressor with a compressor impeller, the expander impeller and the compressor impeller being rotated by a same shaft, and the compressor compressing a gas output by the expander, the controller comprising:
an interface configured to,
receive information on a pressure and a temperature of an incoming gas entering the expander, a pressure and a temperature of the gas output by the expander, and a rotating speed of the shaft, and
output commands to a compressor set of inlet vanes configured to control a pressure of the gas input in the compressor; and
a control unit connected to the interface and configured to,
receive the first, second and third information from the interface,
determine when the turboexpander-compressor system functions in off-design conditions,
generate the commands for the compressor set of moveable inlet guide vanes to maintain a ratio between the rotating speed of the shaft and a drop of enthalpy across the expander within a predetermined range, in off-design conditions; and
control the compressor set of moveable inlet guide vanes to adjust a pressure of the gas input into the compressor such as to bring the ratio closer to the predetermined range.

16. The controller of claim 15, wherein an expander efficiency is related to the ratio of the rotating speed of the shaft and the drop of the enthalpy across the expander.

17. The controller of claim 15, wherein the controller is configured to use of a first sensor configured to measure the rotating speed of the shaft; a second sensor configured to measure the pressure of the incoming gas; a third sensor configured to measure the temperature of the incoming gas; a fourth sensor configured to measure the pressure of the gas output by the expander; and a fifth sensor configured to measure the temperature of the gas output by the expander, wherein the drop in the enthalpy is estimated using the information achieved from the first, second, third, fourth and fifth sensors.

18. The controller of claim 15, wherein to measure pressure, the controller is configure to measure a pressure of the gas input in the compressor comprises using a sensor located at an inlet of the compressor, and connected to the controller.

19. The controller of claim 15, wherein the controller is configured to determine when the turboexpander-compressor system functions in off-design conditions.

20. The controller of claim 15, wherein the controller is further configured to estimate the drop of the enthalpy across the expander using a function of the pressure of the incoming gas, the temperature of the incoming gas, a composition of the incoming gas, and the pressure of the gas output by the expander.

* * * * *